May 28, 1935. W. M. GLEZEN 2,002,980
SHOCK ABSORBER
Filed May 31, 1933
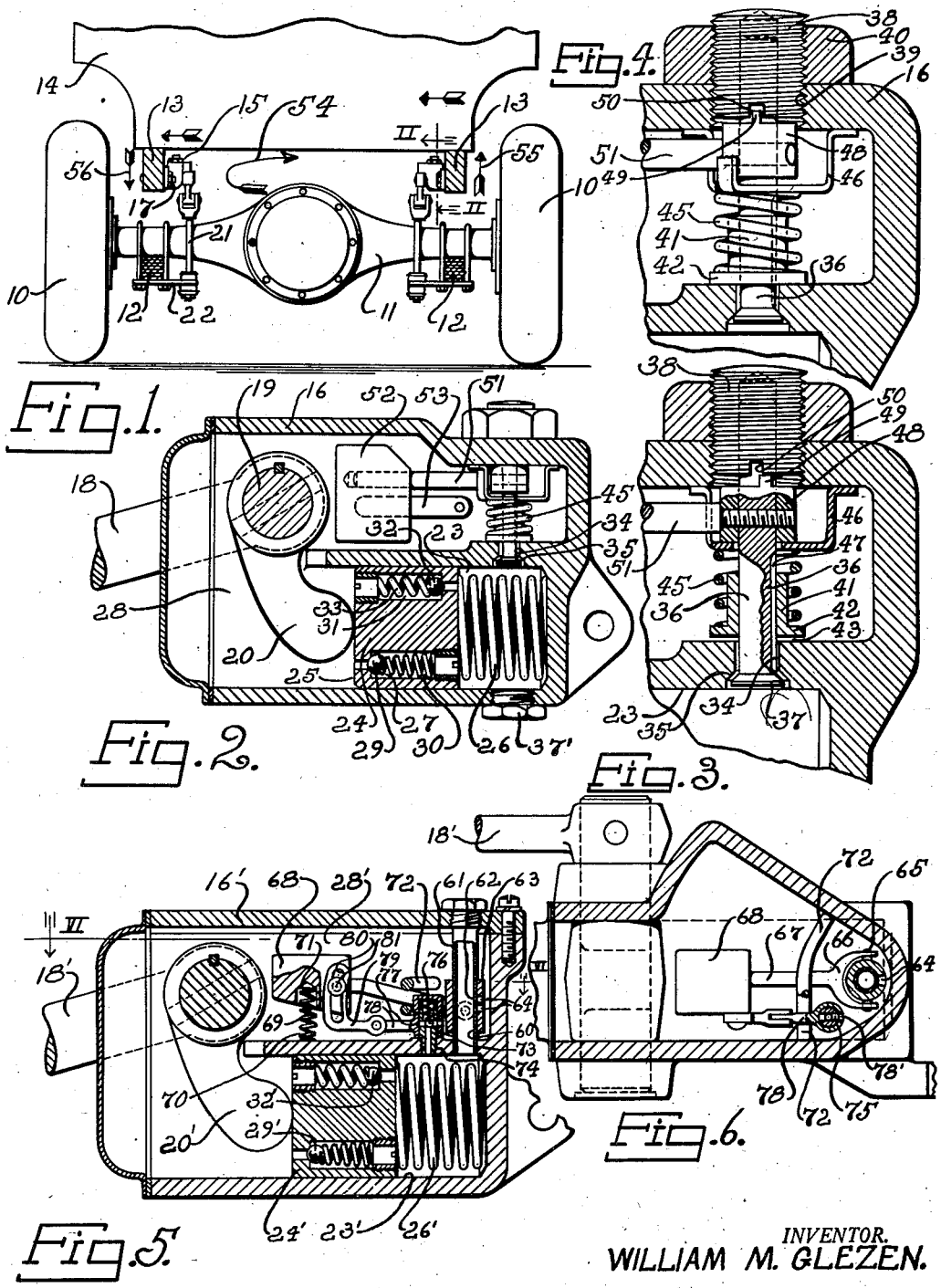
INVENTOR.
WILLIAM M. GLEZEN.
BY *Jung Herness*
ATTORNEYS.

Patented May 28, 1935

2,002,980

UNITED STATES PATENT OFFICE 2,002,980

SHOCK ABSORBER

William M. Glezen, Detroit, Mich.

Application May 31, 1933, Serial No. 673,710

12 Claims. (Cl. 267—8)

This invention relates to an improved vehicle shock absorber and particularly to the provision of means in a device of this character for preventing side sway of the sprung portion of the vehicle as the latter deviates from a straight course or is driven in a curved course.

The main objects of the invention are to provide means in a vehicle shock absorber for preventing upward movement of the body of the sprung portion of a vehicle which is located closest to the center of a curved path thereof relative to the corresponding side of the unsprung portion of the vehicle; to provide means of this character which conditions those parts of a shock absorber that normally control the relative movements of the sprung and unsprung portion to substantially positively prevent relative movement of a pair of corresponding sides of the sprung and unsprung portions in one direction as the vehicle on which the shock absorber is mounted deviates from a straight course or proceeds along a curved course; to provide automatically operable means of this kind which is responsive to the side sway that occurs when the direction of the course of a vehicle is changed, as well as to centrifugal action during driving of a vehicle in a curved path; and to provide means for returning the shock absorber control apparatus to its normal operating condition as the course of the vehicle becomes straight.

Further objects of the invention are to provide means in a hydraulic shock absorber for preventing the escapement of fluid medium from that part of the chamber in which it is placed under pressure by the tendency of one side of the sprung portion of a vehicle to move upwardly relative to the unsprung portion thereof while the vehicle is deviating from a straight course or being driven in a curved course; to provide means of this character which is adapted to be moved to an operative position by the pressure of the fluid of the shock absorber and which prevents the flow of fluid from the pressure chamber through both the normal metering orifice of the shock absorber and the normal relief valve thereof during driving of a vehicle in the above manner; to provide means of this character which is normally inoperative and which in no way interferes with either the normal metering outlet of the pressure chamber or the normal relief valve control thereof during straight driving of the vehicle; and to provide an emergency relief valve in a shock absorber of this kind which is adapted to prevent the creation of excessive pressure in said chamber while the flow of fluid through the normal metering outlet and normal relief valve is interrupted.

A further object of the invention is to provide combined side sway and inertia controlled apparatus in a shock absorber for changing the character of the opposition provided thereby to relative movement of the sprung and unsprung portions of a vehicle when the latter deviates from a straight course or is driven in a curved course and which also varies the character of such opposition when the sprung portion of a vehicle is urged vertically by road roughness and irregularities.

An illustrative embodiment of the invention is shown in the accompanying drawing, in which:

Fig. 1 is a fragmentary rear end elevation of a vehicle, partially in section, which is equipped with my improved shock absorbers.

Fig. 2 is a longitudinal vertical sectional view of a shock absorber embodying one form of my invention taken on the line II—II of Fig. 1.

Fig. 3 is an enlarged fragmentary sectional view showing the side sway control apparatus in an inoperative position.

Fig. 4 is a view similar to Fig. 3 but showing the side sway control apparatus in an operative position.

Fig. 5 is a longitudinal vertical sectional view of a shock absorber embodying a different form of my invention and including both side sway and inertia control apparatus.

Fig. 6 is a horizontal sectional view taken on the line VI—VI of Fig. 5.

In Fig. 1, my improved shock absorber is illustrated in conjunction with a vehicle of substantially conventional design which includes rear road wheels 10 and a rear axle housing 11, as well as a front axle and road wheels (not shown), all of which together constitute the main part of the unsprung portion of the vehicle. Springs 12 mounted on the rear axle housing 11 and similar front springs (not shown) carried by the front axle yieldably support the sprung portion of the vehicle including a chassis frame, of which only side rails 13 are illustrated in the drawing, and a body portion diagrammatically illustrated at 14. The springs provide for relative movement of the sprung and unsprung portions of the vehicle which is controlled by the shock absorber generally illustrated at 15.

Each shock absorber includes a casing 16 which is secured to one of the portions of the vehicle, preferably the sprung portion thereof, by bolts 17 which extend through the chassis side rail 13.

Journaled in each casing 16 is a lever having an external arm 18 and an internal journal portion 19 on which is non-rotatably fixed a cam 20. The outer extremity of the external arm 18 of the crank is pivotally connected by suitable linkage 21 to a bracket 22 mounted on a part of the unsprung portion of the vehicle.

Formed in the casing 16 is a cylinder 23 in which a reciprocating piston 24 is slidably mounted. The outer extremity 25 of the piston 24 is held in contact with the cam 20 of the crank by a coil spring 26 which bears between the inner extremities of the piston and cylinder 24 and 23 respectively. The piston 24 is provided with an axially extending passage 27 communicating at one end with the interior of the cylinder 23 and at its other end with the remaining interior portion of the casing which constitutes a fluid medium chamber 28. The passage 27 is equipped with one-way acting valve mechanism including a ball valve 29 and a spring 30 for preventing the flow of fluid medium through the passage 27 during inward movement of the piston. This valve admits fluid medium from the reservoir 28 to the interior of the cylinder 23 during rear or outward movement of the piston by the coil spring 26. The piston 24 is provided with another passage 31 which is equipped with emergency relief valve mechanism including a ball valve 32 and a comparatively rigid coil spring 33. The relief valve permits the escapement of fluid from the interior of the cylinder 23 when the pressure therein exceeds a predetermined value so as to protect the parts of the device from injury by excessive pressures.

Formed in the upper wall of the cylinder 23 is an outlet passage 34 having a surrounding valve seat 35 adjacent the interior of the cylinder. A valve stem 36 having a valve head 37 on its lower end extends through the outlet passage 34, there being a substantial clearance between the wall of the outlet opening 34 and the periphery of the valve stem 36 to permit substantially free flow of fluid medium from the interior of the cylinder 23 under certain conditions hereinafter set forth. In assembling the device, this valve member may be inserted through the normally plugged threaded aperture 37' in the lower wall of the casing. The upper end portion of the valve stem 36 is slidably guided and journaled in a closed end tubular plug 38 which is threaded in an opening 39 in the upper wall of the casing 16. The plug 38 may be held in a predetermined adjusted position by a lock nut 40 threaded on its outer end portion and located adjacent the top wall of the casing.

Slidably mounted on the intermediate portion of the valve stem 36 between the upper walls of the cylinder 23 and casing 16 is a substantially close fitting collar 41 having an outwardly extending radial flange 42 adjacent a substantially flat face 43 provided on the top wall of the cylinder 23. The flange 42 is normally held in sealed engagement with the flat surface 43, by a coil spring 45 bearing between a bracket 46 extending downwardly from the upper wall of the casing and the flange of the collar 41, in such a manner as to serve as a normal relief valve. The spring 45 is calibrated to permit lifting of the collar 41 when a predetermined pressure is created in the cylinder 23 by reason, for example, of the rapid inward movement of the piston 24 which occurs when the wheels of the vehicle encounter a severe bump or other road irregularity. Formed in the periphery of the valve stem 36 is an axially extending slot 47 which communicates with the interior of the cylinder 23, when the valve 37 is open, and communicates with the fluid reservoir at a location above the upper extremity of the collar 41. The slot 47 constitutes a normal metering outlet or orifice through which fluid may escape from the cylinder 23 so as to yieldably oppose the moderately slow inward movement of the piston 24 which occurs as the vehicle is driven over a comparatively smooth road surface.

Retarding of inward movement of the piston 24 by controlling the escapement of the fluid medium from the interior of the cylinder 23, it should be understood, yieldably resists rotation of the crank part of the shock absorber and accordingly yieldably opposes relative movement of the sprung and unsprung portions of the vehicle in one direction. With the structure shown, only upward movement of the body is opposed by the shock absorber for the reason that the shock absorbers are arranged in such a manner as to cause counter-clockwise rotation of the crank and inward movement of the piston 24 when the sprung portion of the vehicle is thrust upwardly relative to the unsprung portion thereof.

Concentrically mounted on the upper end portion of the valve stem 36 between the lower extremity of the bracket 46 and the inner surface of the top wall of the casing 16 is a collar 48 having an upstanding lug 49 on its upper extremity which is adapted to register with and be received in a recess 50 formed in the lower extremity of the externally threaded plug 38 when the collar is in a predetermined angular relation with respect to the plug 38. When the collar is not in such predetermined angular relation to the plug 38, the outer extremity of the lug 49 bears against and rides upon the lower extremity of the threaded plug 38 in such a manner as to prevent upward movement of the collar and corresponding movement of the valve stem 36 and valve head 37, to which the collar is fixed by an arm 51 threaded in registering apertures in the collar 48 and valve stem 36. Thus, when the lug 49 and recess 50 are not aligned, the pressure applied on the valve head 37 by the fluid medium in the cylinder 23 cannot move the valve to a closed position.

A weight 52 mounted on the free extremity of the arm 51 is relied upon to turn the collar 48 so as to index the lug 49 with the recess 50 when it is desirable to have the above valve movement obstructing mechanism rendered inoperative. The valve controlling mechanism is normally held in inoperative position by a resilient member or spring 53 mounted on a side wall of the casing and having a free end portion which bears against the weight 52, as shown in Fig. 2.

In operation of the form of my invention illustrated in Figs. 2, 3, and 4, as the vehicle deviates from a straight course to the right, as illustrated by the arrow 54, or while the vehicle is being driven in a rightwardly curved course, the right hand side of the vehicle is urged upwardly, as illustrated by the arrow 55, and the left side of the vehicle tends to move downwardly in the direction of the arrow 56. The side sway and centrifugal action to which the weight 52 is subjected under these conditions causes the latter to swing against the action of the spring 53 in a clockwise direction, as viewed from above in Fig. 2, thereby causing the lug 49 to be indexed with the slot 50, as illustrated in Fig. 4. This action occurs promptly during the initial deviation of the vehicle from a straight course and conditions the mechanism to permit closing of the valve 37 under the influence of the pressure exerted thereon by the fluid medium in the cylinder 23. When the valve 37 is closed it effectively prevents the escapement of fluid medium from the interior of the cylinder through either the normal metering passage 47 or by way of the normal relief valve mechanism. As a result, inward movement of the piston 24 is substantially positively arrested and the separatory movement of the right hand sides of the sprung and unsprung portions of the vehicle is rigidly opposed and excessive side sway of the sprung portion of the vehicle is prevented.

When the vehicle deviates from a straight course to the left or is driven in a leftward curved course, as viewed in Fig. 1, the above described mechanism of both the front and rear shock absorbers on the left side of the vehicle operate, as set forth above, to hold the left sides of the sprung and unsprung portions of the vehicle against separatory movement.

In the form of my invention shown in Figs. 5 and 6, the improved side sway control mechanism is combined with inertia controlled mechanism of the type which increases the opposition to relative movement of the sprung and unsprung portions of a vehicle when the sprung portion thereof is violently urged in a vertical direction as, for example, when the road wheels of the vehicle encounter a severe road irregularity. This mechanism is embodied in a shock absorber having a casing 16' similar to the casing 16 shown in Figs. 1 to 4, inclusive, which is provided with a cylinder 23' in which a piston 24' is slidably mounted. The piston 24' is substantially identical to the piston 24, illustrated in Fig. 2, and it is also provided with a one-way acting inlet valve 29' and a one-way acting emergency relief valve 32'. A coil spring 26' normally urges the piston 24' outwardly with respect to the cylinder and maintains the piston in engagement with a cam member 20' of a crank having an external end portion 18' flexibly connected in the above manner with the unsprung portion of a vehicle.

The upper wall of the cylinder 23' has an outlet passage 60 in which an upstanding tube 61 is fitted. The lower end of the tube 61 communicates with the interior of the casing 23' and the side wall of the tube is provided with metering orifices 62 for normally admitting the passage of fluid medium from the interior of the cylinder to the oil reservoir 28' constituted by the remaining portion of the interior of the casing 16' excluding the interior of the cylinder. A close-fitting collar 63 is slidably mounted on the outer periphery of the tube 61 and provided with spaced openings 64 which are adapted to normally register with the metering orifices 62 of the tube. This collar carries diametrically opposite trunnions 65 on which the ends of opposite branches of a yoke member 66 are journaled. The yoke 66 has a protruding arm 67 provided on its outer end with a weight 68 which rests upon and is supported in part by a comparatively soft acting coil spring 69 fixed at 70 to the top wall of the cylinder and extending into a recess 71 formed in the weight. The arm 67 rests upon one of a pair of spaced cross bars or guide members 72 which are fixed at their ends to the opposite side walls of the casing. During violent vertical movement of the sprung portion of the body the corresponding movement of the weight 68, by reason of its inertia, lags the movement of the casing 16' which is carried by the sprung portion of the vehicle, thereby causing movement of the collar 63 relative to the tube 61 of sufficient amplitude to move both of the openings 64 of the collar partially or completely out of registration with the openings 62 of tube 61. This action either meters or prevents the normal escapement of the fluid medium from the cylinder 23 and, accordingly, increases the opposition which the shock absorbing device exerts upon upward movement of the sprung portion of the vehicle.

When the vehicle deviates from a straight course or is driven in a curved course the centrifugal action and initial side sway of the vehicle causes the weight 68 to swing about the axis of the tube 61, as viewed in Fig. 6, thereby turning the collar relative to the tube sufficiently to bring the apertures 62 of the latter and apertures 64 of the collar out of registering relation. The normal escapement of the fluid medium from the cylinder 23' is prevented in this manner and accordingly the opposition of the device to relative movement of the sprung and unsprung portions of the vehicle which it is designed to control is increased.

When a shock absorber of the character shown in Figs. 5 and 6 is equipped with a normal relief valve for the purpose of lessening the opposition of the device to moderately severe relative movements of the sprung and unsprung portions of the vehicle it is desirable to render such a relief valve inoperative during side sway control. One way in which this result may be accomplished is illustrated in Figs. 5 and 6 wherein the normal relief valve includes a tubular fitting 73 which is threaded in an opening 74 in the wall of the casing 23'. The fitting 73 is provided with a passage having an outlet 75 communicating with the fluid reservoir and with a spring pressed ball valve 76 which normally prevents escapement of fluid by way of the relief valve mechanism until a predetermined pressure is built up in the cylinder. Rotatably mounted on the fitting 73 is a collar 77 which is provided with an opening 78' adapted to register with the outlet 75 of the passage in the fitting. The collar 77 has an arm 78 which is flexibly connected with the weight 68 by a link 79. The outer end of the link 79 is provided with an elongated slot 80 through which a rivet 81, carried by the weight, extends. When the weight swings about the axis of the tube 61 during deviating of the vehicle from a straight course or driving thereof in a curved course the collar 77 is rotated by the link 79 and arm 78, in such a manner as to bring the aperture 78' of the collar 77 out of registration with the outlet 75, thereby preventing the escapement of fluid medium from the interior of the cylinder by way of the relief valve regardless of the pressure thereon. In this manner inward movement of the piston 24' is substantially positively prevented until the pressure in the cylinder becomes great enough to open the emergency relief valve 32, and therefore side sway of the sprung portion of the vehicle is effectively guarded against by mechanism which may also be relied upon for effecting inertia control.

Although but several specific embodiments of my invention are herein shown and described, it will be understood that various changes in the size, shape, and arrangement of parts may be made without departing from the spirit of my invention and it is not my intention to limit its scope other than by the terms of the appended claims.

What I claim is:

1. In a vehicle having relatively movable sprung and unsprung parts, a hydraulic shock absorber including a fluid medium compression chamber and mechanism for normally yieldably opposing relative movement of said parts in at least one direction, said mechanism including a normal metering orifice and a normal relief valve, and means operable when said vehicle is deviated from a straight course and when it is driven in a curved course adapted to hold the fluid medium of said shock absorber against passage from said compression chamber through said metering orifice and relief valve so as to maintain increased opposition to separatory movement of said sprung and unsprung parts while said vehicle is driven in a curved course.

2. In a vehicle having relatively movable sprung and unsprung parts, a hydraulic shock absorber including mechanism having a fluid pressure medium for normally yieldably opposing relative movement of said parts in at least one direction, said mechanism including a normal metering orifice for regulating the flow of said medium, and means operable by said fluid pressure medium when said vehicle is deviated from a straight course and when it is driven in a curved course adapted to prevent the flow of fluid medium through said metering orifice so as to maintain increased opposition to separatory movement of said sprung and unsprung parts while said vehicle is driven in a curved course.

3. In a vehicle having relatively movable sprung and unsprung parts, a shock absorber including mechanism for normally yieldably opposing relative movement of said parts in at least one direction, means operable by relative movement of said parts for increasing the opposition to such movement, holding mechanism for normally maintaining said means inoperative and means operable by centrifugal action when said vehicle is driven in a curved course or deviated from a straight course for rendering said holding mechanism inoperative.

4. In a vehicle having relatively movable sprung and unsprung parts, a hydraulic shock absorber including a casing connected with one of said parts and having a member movable relative to said casing and connected with the other part, a cylinder in said casing having an outlet provided with a normal metering orifice and a relief opening, a piston in said cylinder engaged with said member for opposing relative movement of said sprung and unsprung parts in one direction, a relief valve in said opening, a normally open valve in said outlet on the cylinder side of said orifice and said relief opening adapted to be closed by the pressure of fluid medium in said cylinder for preventing the escapement of fluid medium from said cylinder, and means for holding said normally open valve against closing, said means being movable to an inoperative position by centrifugal action when said vehicle deviates from a straight course.

5. In a vehicle having relatively movable sprung and unsprung parts, a hydraulic shock absorber including a casing connected with one of said parts and having a member movable relative to said casing and connected with the other part, a cylinder in said casing having an outlet provided with a normal metering orifice, a piston in said cylinder engaged with said member for yieldably opposing relative movement of said sprung and unsprung parts in at least one direction, a normally open valve in said outlet on the cylinder side of said metering orifice adapted to be closed by the pressure of fluid medium in said cylinder for preventing the escapement of fluid medium from said cylinder, and means for holding said normally open valve against closing, said means being movable to an inoperative position by centrifugal action when said vehicle deviates from a straight course.

6. In a vehicle having relatively movable sprung and unsprung parts, a fluid pressure shock absorber including a piston and cylinder having fluid medium therein for yieldably opposing movement of said parts in at least one direction, said cylinder being provided with an outlet, a valve in said outlet adapted to be closed by the pressure in said cylinder, mechanism normally holding said valve against closing under the influence of said pressure, and means operable by centrifugal action when said vehicle is deviated from a straight course for rendering said valve holding mechanism inoperative.

7. A shock absorber including a casing securable to one part of a vehicle, a member movable relative to said casing and securable to a relatively movable part of said vehicle, a cylinder in said casing having an outlet, a valve member rotatably and shiftably mounted in said casing having a valve on one end disposed in said outlet and adapted to completely seal the latter, means on said casing and valve member for holding the latter against closing including elements having a normally misaligned slot and lug respectively, and means for turning said valve member adapted to bring said slot and lug into registering relationship when said vehicle is deviated from a straight course so as to oppose movement of the relatively movable parts of said vehicle in a predetermined direction.

8. A shock absorber including a casing securable to one part of a vehicle, a member movable relative to said casing and securable to a relatively movable part of said vehicle, a cylinder in said casing having an outlet, a valve member rotatably and shiftably mounted in said casing having a valve on one end disposed in said outlet and adapted to completely seal the latter, means on said casing and valve member for holding the latter against closing including elements having a normally misaligned slot and lug respectively, means for turning said valve member adapted to bring said slot and lug into registering relationship when said vehicle is deviated from a straight course so as to oppose movement of the relatively movable parts of said vehicle in a predetermined direction, and a resilient element normally urging said lug toward a misaligned relationship with respect to said slot.

9. In a vehicle having relatively movable sprung and unsprung parts, a fluid pressure shock absorber including mechanism for normally yieldably opposing movement of said sprung part relative to said unsprung part in at least one direction, said mechanism including a piston and a cylinder having a metering outlet orifice communicating with the interior thereof, a member for varying the effective area of said orifice, and means responsive to acceleration of movement of said shock absorber in at least one vertical direction for operating said member, said means being adapted to bring said member into a substantially fully closed relationship with said metering orifice when said vehicle is deviated from a straight course so as to prevent side sway of one of said vehicle parts.

10. In a vehicle having relatively movable sprung and unsprung parts, a fluid pressure shock absorber including mechanism for normally yieldably opposing movement of said sprung part relative to said unsprung part in at least one direction, said mechanism including a piston and a cylinder having a metering outlet orifice communicating with the interior thereof, a member for varying the effective area of said orifice, means responsive to acceleration of movement of said shock absorber in at least one vertical direction for operating said member, said means being adapted to bring said member into a substantially fully closed relationship with said metering orifice when said vehicle is deviated from a straight course, a relief valve means communicating with the interior of said cylinder for limiting the magnitude of opposition to relative movement of said sprung and unsprung parts, and apparatus operable by said first mentioned means for rendering said relief valve inoperative.

11. In a vehicle having relatively movable sprung and unsprung parts, a fluid pressure shock absorber including a piston and cylinder having fluid medium therein for yieldably opposing movement of said parts in at least one direction, said cylinder being provided with a normal outlet and a relief outlet, a relief valve normally closing said relief outlet, means for obstructing the flow of said fluid pressure medium through said normal and relief outlets, said means being adapted to be moved to an operative position by the pressure in said cylinder, mechanism normally holding said means against moving to an operative position under the influence of said pressure, and means operable by centrifugal action when said vehicle is deviated from a straight course for rendering said holding mechanism inoperative.

12. In a vehicle having relatively movable sprung and unsprung parts, a fluid pressure shock absorber including a piston and cylinder having fluid medium therein for yieldably opposing movement of said parts in at least one direction, said cylinder being provided with a normal outlet and a relief outlet, a relief valve normally closing said relief outlet, means for obstructing the flow of said fluid pressure medium through said normal and relief outlets, said means being adapted to be moved to an operative position by the pressure in said cylinder, mechanism normally holding said means against moving to an operative position under the influence of said pressure, means operable by centrifugal action when said vehicle is deviated from a straight course for rendering said holding mechanism inoperative, and an emergency relief valve independent of said outlets and said fluid medium obstructing means operable irrespective of the position of said holding mechanism for relieving the pressure in said cylinder when a predetermined pressure therein is exceeded.

WILLIAM M. GLEZEN.